Aug. 4, 1959  S. L. HILLWICK ET AL  2,898,008
AIRBORNE SEEDER
Filed Nov. 26, 1957  3 Sheets-Sheet 2

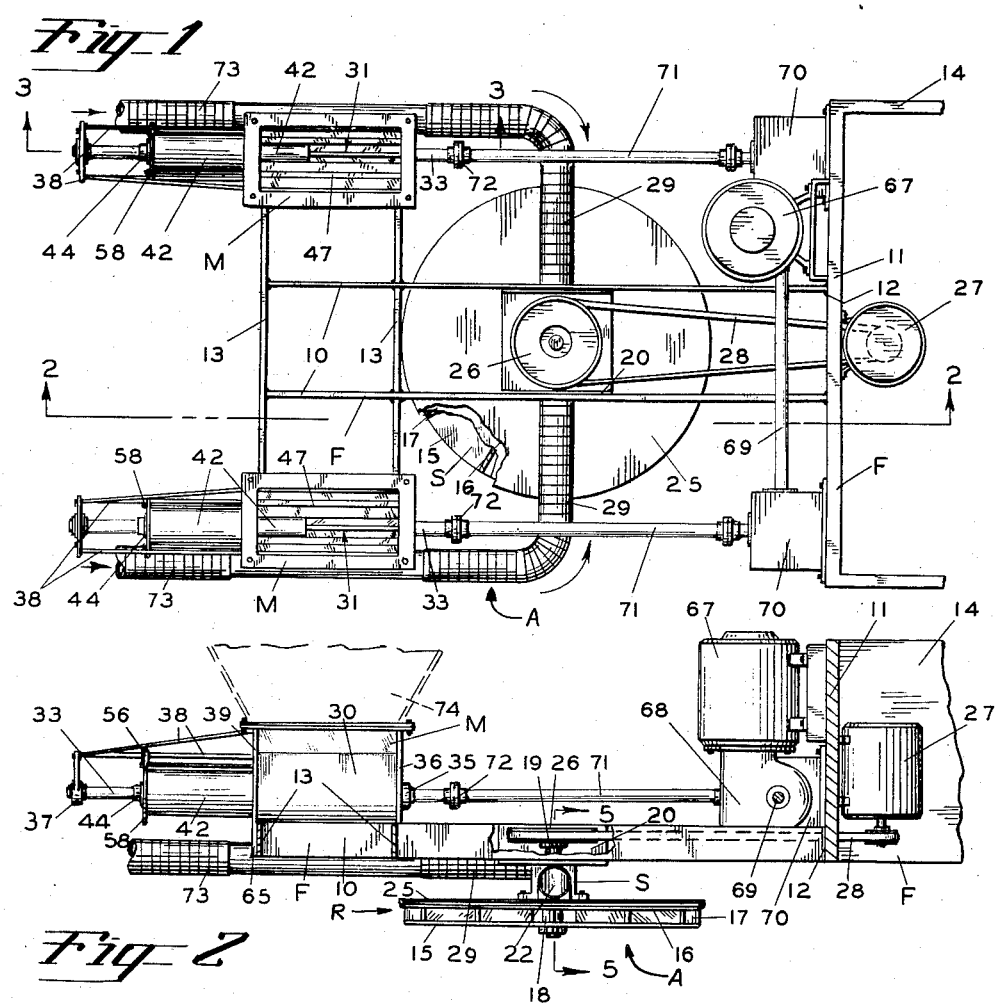

INVENTORS
STANLEY L. HILLWICK
WAYNE M. COOPER
BY
Kimmel & Crowell

Aug. 4, 1959    S. L. HILLWICK ET AL    2,898,008
AIRBORNE SEEDER
Filed Nov. 26, 1957    3 Sheets-Sheet 3
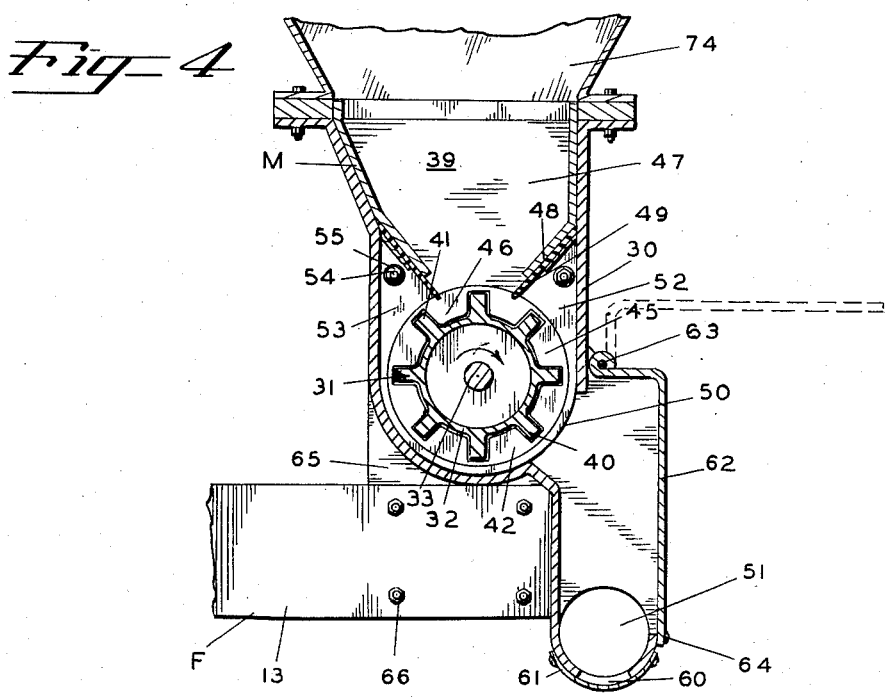
Fig-4
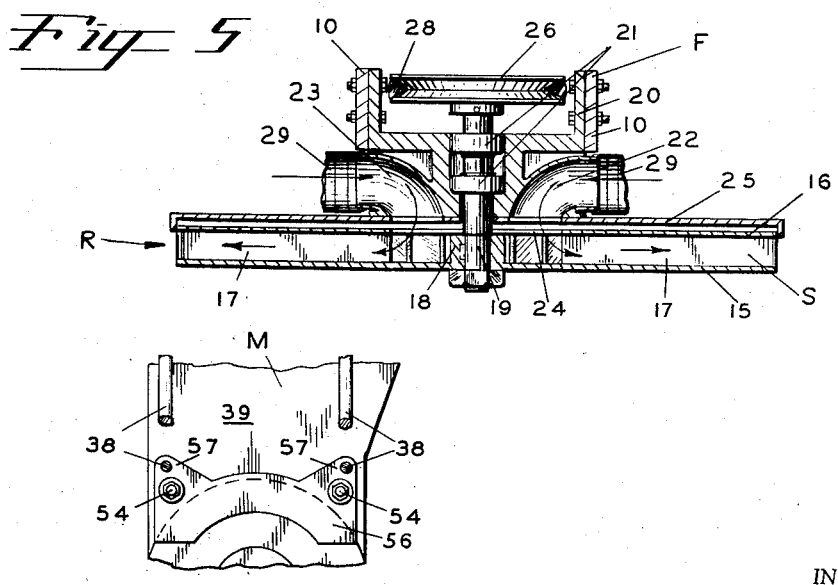
Fig-5
Fig-6
INVENTORS
STANLEY L. HILLWICK
WAYNE M. COOPER
BY
Kimmel & Crowell

United States Patent Office 2,898,008
Patented Aug. 4, 1959

2,898,008

AIRBORNE SEEDER

Stanley L. Hillwick and Wayne M. Cooper, Yakima, Wash., assignors to Economy Pest Control, Yakima, Wash., a corporation of Washington Application November 26, 1957, Serial No. 699,064

1 Claim. (Cl. 222—303)

This invention relates to airborne seeders, and particularly to centrifugal seed spreaders supported from helicopters and the like.

The primary object of the invention is to provide a seed measuring device to work in combination with centrifugal seeders so that the amount of seed spread over an area can be accurately controlled.

In the spreading of seeds for trees in reforestation, the cost of the seed is very expensive, therefore, it is very important that the seed be properly spread at a predetermined count per square acre. With this new and improved device, the amount of seed fed into the centrifugal spreader can be measured while the device is on the ground before being airborne. This is accomplished by establishing the amount of seed flowing through the measuring device corresponding to the miles per hour speed over an area to be seeded.

Another object of this invention is to provide a seeder for airborne use that can be easily installed on a helicopter or the like, and that can be adjusted for the measuring of the exact amount of seed to be spread over a given area.

Other objects and advantages will become apparent in the following specification when considered in the light of the attached drawings, in which:

Figure 1 is a plan view of the invention shown partially broken away for convenience of illustration.

Figure 2 is a sectional side view, taken on the line 2—2 of Figure 1, looking in the direction of the arrows.

Figure 4 is a transverse vertical sectional view, taken on the line 4—4 of Figure 3, looking in the direction of the arrows.

Figure 5 is a vertical sectional view, taken along the line 5—5 of Figure 2, looking in the direction of the arrows.

Figure 6 is a fragmentary detailed view, taken on the line 6—6 of Figure 3, looking in the direction of the arrows.

Figure 3:
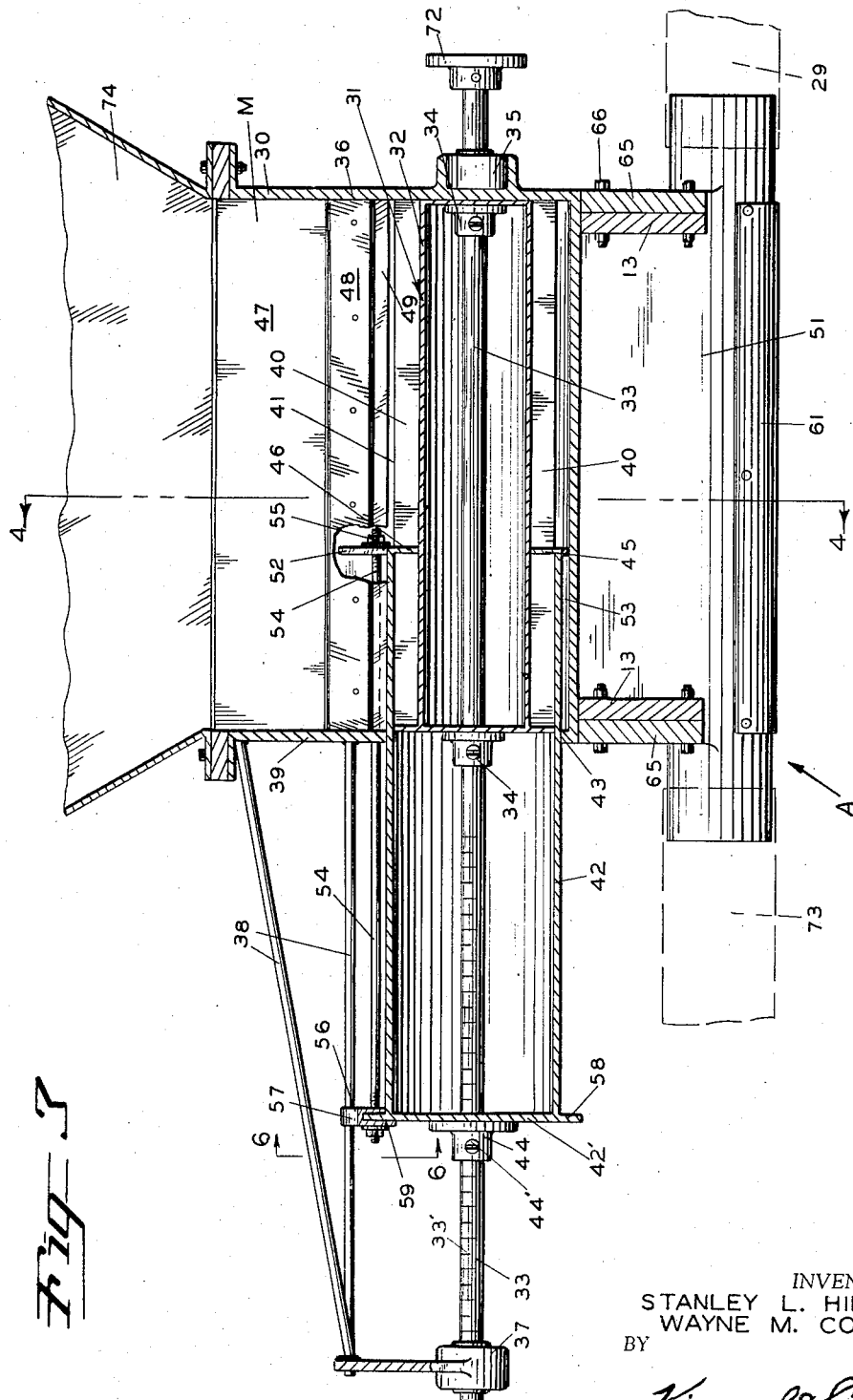
Figure 3 is a longitudinal sectional view, taken on the line 3—3 of Figure 1, looking in the direction of the arrows.

Referring now to the drawings in detail wherein like reference numerals indicate like parts throughout the several figures, the reference character A indicates generally an airborne seeder which includes a frame F. The frame F has spaced bars 10 disposed parallel to the center line of a helicopter. A transverse bar 11 is secured to one end of the parallel bars 10 by means of welding 12. A pair of transverse parallel bars 13 are fixedly secured by welding to the bars 10 at the end opposite the bar 11.

The frame F is mounted to the underside of the framework of a helicopter (not shown) by any suitable means, as by hangers 14. We have illustrated a centrifugal seed spreader S mounted to the underside of the frame F. This seed spreader S consists of a rotor R, having a pair of solid disks 15 and 16, with radial fins 17 fixedly secured therebetween by any suitable means. A hub 18 is located in the center of the disks 15 and 16 and is keyed to a vertical shaft 19.

The shaft 19 is journalled within a hub 20 on bearings 21. The hub 20 is bolted to and between the frame bars 10, as best illustrated in Figures 1, 2 and 5. A pair of nozzles 22 and 23 form part of the lower portion of the hub 20, as best illustrated in Figure 5. The nozzles 22 and 23 are directed to an opening 24 within the disks 15 and 16 and are for the purpose of introducing the seed into the center of the rotor R, which then distributes the seed over a predetermined area. A protecting shield 25 is provided over the rotor R.

A belt pulley 26 is keyed to the upper end of the shaft 19 and is driven by a V-belt 28 from a motor 27 bolted to the transverse bar 11. The measuring device M delivers seed to the nozzles 22 through flexible hose lines 29.

The construction of a seed measuring device M will now be described. The seed measuring device M includes an elongated trough-like body 30 having rotatably journalled therein a seed measuring rotor, generally indicated at 31. The rotor 31 includes a drum 32, which is fixedly secured to the shaft 33 on its hubs 34. The shaft 33 is journalled within a bearing 35 mounted with the end 36 of the body 30 at its one end, and within an outboard bearing 37 at its opposite end. The bearing 37 is supported by bracket arms 38, which are fixedly secured to the opposite end 39 of the body 30.

The drum 32 of the rotor 31 has radially outwardly extending fins 40 forming part thereof throughout its entire length. Surrounding the outer ends 41 of the fins 40 is a solid drum 42. The drum 42 passes through the opening 43 within the end 39 of the body 30, as best illustrated in Figure 3, having its closed outer end 42′ fixedly and adjustably secured to the shaft 33 by a hub 44 and locking screw 44′. The inner end of the drum 42 closes the spaces 45 between the fins 40 by means of the inwardly extending webs 46 which form part of the inner end of the drum 42.

Located within the upper side of the body member 30 is a hopper 47 which has sloping bottoms 48 to which are secured flexible lower extensions 49. The principle of this measuring device is that the position of the inner end pieces 46 of the drum 42 determines the amount of seed to be taken from the hopper 47 into the space 45 between the fins 40 discharging the same out through the opening 50 of the body 30 into the seed receiving chamber 51, as best illustrated in Figures 3 and 4.

The flow of seed into the chamber 51 can be very accurately determined by the position of the inner end of the drum 42 within the body 30 of the measuring unit M. As the rotor 31 is revolved in the direction of the arrow, it will measure out from the hopper 47 between the end 36 of the body 30 and the inner end 46 of the drum 42, a predetermined amount of seed, as no seed can enter between the fins 40 of the rotor wherever the drum 42 covers these fins 40.

A closure plate 52 closes the space under the sloping bottoms 48 of the hopper 47 and around the rotor 31 and the drum 42 so that seed can not pass the end 46 of the drum 42 into the space 53 surrounding the rotor 31 and drum 42 within the confines of the body 30.

The plate 52 is fixedly secured to the ends of the push rods 54 by lock nuts 55. The push rods 54 are fixedly secured to guide 56. Ears 57 forming part of the guide 56 slide over the bracket arms 38. The position of the guide 56 is maintained by engaging over the flange 58 forming part of the drum 42. The guide 56 has a groove 59 formed on the inner surface thereof to encompass the flange 58. As the drum 42 is moved in or out of the body 30 of the measuring unit M, the push rods 54 will maintain the closure plate 52 adjacent the end 46 of the drum 42 at all times.

The bottom of the chamber 51 has an opening 60 which is closed by a cap 61 at all times except when the device is being tested for the amount of seed to be spread over an area. A side closure 62 is hingedly mounted to the body 30 at 63 and is held closed by screws 64 at all times, except when it is desired to have access to the rotor 31 for cleansing the same.

The measuring units M are supported upon the transverse bars 13 of the frame F, as best illustrated in Figures 1, 3 and 4. Brackets 65 form part of the measuring units M and are bolted to the bars 13 by bolts 66.

On referring to Figure 1, it will be noted that two units M are mounted to the frame F. The rotors 31 are driven in unison by a motor 67, which in turn drives the gear reduction unit 68 to drive a transverse shaft 69 which enters the gear boxes 70. The motor 67 and the gear reduction unit 68 are mounted to the cross bar 11 by any suitable means. Driving shafts 71 are driven by the gear boxes 70, and are connected to the shaft 33 of the measuring units M by suitable couplings 72.

The chambers 51 extend slightly beyond the body 30 of the measuring units M and receive the flexible tubes 29 leading to the distributing nozzles 22 of the centrifugal spreader S. Flexible pipes 73 connect to the opposite end of the chamber 51 and lead to a source of air, which is derived from a unit mounted on the helicopter, usually consisting of a centrifugal fan, the operation of which will be described later.

In Figures 3 and 4, a fragmentary portion of the lower end of a supply hopper 74 is indicated, the location of which is indicated by broken lines in Figure 2, and eliminated altogether in Figure 1.

We will now describe the mode of operation. The rotors 31 are revolved at a uniform rate of speed simultaneously from the driving motor 67 by the shaft 69, gear boxes 70, and driving shaft 71. In order to determine the amount of seed to be spread over a given area, the cover plates 61 are removed from the chambers 51. The inner end 46 of the cylinder 42 is positioned within the body 30 of the measuring unit for the estimated amount of seed required to be fed through the measuring unit by the rotor 31. This is done by loosening the locking screw 44' within the hub 44 so that the cylinder 42 can be moved in or out of the body 30 of the measuring unit M, the position of the same being indicated by the scale marks 33' on the shaft 33. This will allow a certain amount of seed to be fed from the hopper 47 onto the rotor 31.

A measure, not here shown, is placed under the openings 60 of the chamber 51, the rotors 31 are revolved for a given period of time which will correspond to the distance that the helicopter will be traversed over an area. When the amount of seed dispensed through the rotor 31 agrees with the volume of seed calculated for this given area to be fed through the measuring unit, the operator will know that the proper setting has been made of the position of the inner end 46 of the drum 42. He can then replace the cover plate 61 on the chamber 51 and he is ready to proceed in the seeding of the area.

In the operation of the seeder, air may be delivered from a source of supply on the helicopter through the tubes 73 picking up the seeds dropping in the chambers 51 of the measuring units M, blowing them through the tubes 29 into the nozzles 22 through the opening 24 of the centrifugal seeder unit S, which will be revolving at a high rate of speed.

The seeds will follow the arrows, referring to Figure 5, and out through the periphery of the revolving disks 15 and 16 by the fins 17. The rotation of the rotor R will spread the seed, which will also cause a suction from the nozzles 22 and from the chambers 51 of the measuring units. In many cases this suction is sufficient to carry the seed from the chambers 51 into the rotor R in the operation of the seeder S.

Having thus described the preferred embodiment of the invention, it should be understood that numerous structural modifications and adaptations may be resorted to without departing from the scope of the appended claim.

What is claimed is:

A dispenser comprising an elongated hopper, a semi-cylindrical housing secured beneath said hopper co-extensive therewith, an elongated shaft extending axially through said housing and journalled for rotation therein, an elongated drum mounted on said shaft in said housing for rotation with said shaft, a plurality of radial fins projecting outwardly of said drum and extending from one end thereof to the other, a second drum having a diameter greater than that of said fins for adjustably enclosing said fins from one end thereof to vary the exposed dispensing portions of said fins to control the quantity of material dispensed from said hopper, means supporting said second drum on said shaft for axial sliding movement thereon, an inner end wall supported on said second drum having portions thereof extending radially inwardly into each of the spaces between said fins, and means for axially adjusting said second drum with respect to said first drum.

References Cited in the file of this patent

UNITED STATES PATENTS

| 183,321 | Nauman | Oct. 17, 1876 |
| 603,309 | Yeagley | May 3, 1898 |
| 920,656 | Ross | May 4, 1909 |
| 1,814,483 | Morgan | July 14, 1931 |
| 2,045,709 | Hortwell | June 30, 1936 |
| 2,603,388 | Bryant | July 15, 1952 |
| 2,619,355 | Trees | Nov. 25, 1952 |

FOREIGN PATENTS

| 900,000 | France | Sept. 11, 1944 |